United States Patent
Zhang et al.

(10) Patent No.: US 10,334,661 B2
(45) Date of Patent: Jun. 25, 2019

(54) METHODS AND REPEATER STATIONS FOR ABNORMALITY PROTECTION ON AN EXTENDED TRUNKED RADIO SYSTEM

(71) Applicant: Hytera Communications Corporation Limited, Shenzhen, Guangdong Province (CN)

(72) Inventors: Yingzhe Zhang, Shenzhen (CN); Yan Xu, Shenzhen (CN); Yuwang Tan, Shenzhen (CN); Fan Yang, Shenzhen (CN)

(73) Assignee: HYTERA COMMUNICATIONS CORPORATION LIMITED, Shenzhen, Guangdong Province (CN)

( * ) Notice: Subject to any disclaimer, the term of this patent is extended or adjusted under 35 U.S.C. 154(b) by 184 days.

(21) Appl. No.: 15/302,985

(22) PCT Filed: Mar. 26, 2015

(86) PCT No.: PCT/CN2015/075160
§ 371 (c)(1),
(2) Date: Feb. 6, 2017

(87) PCT Pub. No.: WO2015/144075
PCT Pub. Date: Oct. 1, 2015

(65) Prior Publication Data
US 2017/0171911 A1 Jun. 15, 2017

(30) Foreign Application Priority Data

Mar. 26, 2014 (CN) .......................... 2014 1 0118111

(51) Int. Cl.
*H04W 84/08* (2009.01)
*H04L 29/08* (2006.01)
(Continued)

(52) U.S. Cl.
CPC .......... *H04W 84/08* (2013.01); *H04L 67/104* (2013.01); *H04L 69/40* (2013.01); *H04W 4/08* (2013.01); *H04W 4/10* (2013.01); *H04W 84/18* (2013.01)

(58) Field of Classification Search
None
See application file for complete search history.

(56) References Cited

U.S. PATENT DOCUMENTS 5,627,876 A * 5/1997 Moon .................. H04W 84/08
370/341
9,407,499 B2 * 8/2016 Brown ................ H04L 41/0672
(Continued)

FOREIGN PATENT DOCUMENTS

| CN | 103347246 A | 10/2013 |
|---|---|---|
| CN | 103402030 A | 11/2013 |
| JP | 2010-103716 A | 5/2010 |

*Primary Examiner* — Robert C Scheibel
(74) *Attorney, Agent, or Firm* — Cheng-Ju Chiang

(57) ABSTRACT

Methods for abnormality protection on an extended trunked radio system and associated repeater stations are provided. A method includes: monitoring, by a present repeater, in real time whether there occurs a communication abnormality on a repeater in a local site; if there is detected a communication abnormality on a repeater, determining whether the abnormal repeater is a free repeater; and if the abnormal repeater is a non-free repeater, updating and broadcasting the state information of the abnormal repeater.

16 Claims, 7 Drawing Sheets

(51) Int. Cl.
*H04W 84/18* (2009.01)
*H04W 4/10* (2009.01)
*H04W 4/08* (2009.01)
*H04L 29/14* (2006.01)

(56) References Cited

U.S. PATENT DOCUMENTS

| | | | |
|---|---|---|---|
| 2010/0085952 A1* | 4/2010 | Wiatrowski | H04B 7/15542 370/341 |
| 2010/0085953 A1* | 4/2010 | Patel | H04W 4/20 370/341 |
| 2012/0213058 A1* | 8/2012 | Duan | H04W 74/0841 370/221 |
| 2013/0122899 A1 | 5/2013 | Panpaliya et al. | |
| 2013/0171934 A1 | 7/2013 | Stankovska et al. | |

* cited by examiner

METHODS AND REPEATER STATIONS FOR ABNORMALITY PROTECTION ON AN EXTENDED TRUNKED RADIO SYSTEM

CROSS REFERENCE TO RELATED APPLICATIONS

The present application is a 35 U.S.C. § 371 National Phase conversion of International (PCT) Patent Application No. PCT/CN2015/075160, filed on Mar. 26, 2015, which claims benefit of Chinese Patent Application No. 201410118111.2, filed on Mar. 26, 2014, the disclosure of which is incorporated by reference herein. The PCT International Patent Application was filed and published in Chinese.

TECHNICAL FIELD

The present disclosure generally relates to trunked communications technology, and in particular relates to methods and repeater stations for abnormality (e.g., interference or call drop) protection on an extended trunked radio system.

BACKGROUND

Existing trunked radio systems include two major types of architectures, centralized and distributed. FIG. 1 shows an example of a centralized trunked radio system having a dedicated control channel and center for mobility management. Typically, the control channel may stay in a continual-emitting state while the system terminals may reside on the control channel for listening. To work properly, terminals, after booted, need to be successfully registered on the system. For example, interphone users usually may stay on the control channel, and for each call an interphone needs to send a call request through the control channel to the system and wait for the system to allocate a traffic channel in response to the call request. The system may then notify the interphone to switch to the traffic channel for communication, and the interphone would return to the control channel when the call ends.

However, if there is a disturbance to the control channel or traffic channel of the centralized trunked radio system, the system will not advise the disturbance to the terminal users. As such, if the control channel is interfered with, the terminal would not be able to receive the system-allocated traffic channel information after sending the service call request, leading to a high dropped-call rate (DCR). On the other hand, if the system-allocated traffic channel is disturbed, then after the terminal fails to establish a call on the traffic channel, the terminal would return to the control channel to initiate a call request for a new traffic channel, resulting in a big call-setup delay.

In contrast, a distributed trunked system (DTS) does not require a control channel, but also allows different interphone units to share the system channel resources. So, when a system terminal initiates a call, the channel allocation is actually controlled by the software logic of the terminal rather than determined by the control channel. As such, in a DTS, terminals would need to scan the channels for a vacant channel and start a call on the vacant channel once the vacant channel is found. This, however, increases the system access time; on the other hand, the system provides no treatment with respect to the interference with the repeaters, which also reduces the system access performance.

SUMMARY

A major objective of the present disclosure is to provide a solution for improving the performance of a trunked radio system.

According to the above object, a method for abnormality protection on an extended trunked radio system is provided, the extended trunked radio system being comprised of a plurality of sites each comprising a plurality of repeaters, the plurality of repeaters comprising a plurality of primary repeaters and a free repeater, the method comprising:

monitoring, by a present repeater, in real time whether there occurs a communication abnormality on a repeater in local site;

if there is detected a communication abnormality on a repeater (hence an abnormal repeater or malfunctioning repeater), determining, by the present repeater, whether the abnormal repeater is the free repeater; and if the abnormal repeater is a non-free repeater, updating and broadcasting, by the present repeater, the state information of the abnormal repeater.

There is also provided an associated repeater station, comprising:

an abnormality-monitoring module configured to monitor whether there occurs a communication abnormality on a repeater in local site;

a determination module configured to, if there is detected a communication abnormality on a repeater (hence an abnormal repeater or malfunctioning repeater), determine whether the abnormal repeater is a free repeater; and an update module configured to, if the abnormal repeater is a non-free repeater, update and broadcast the state information of the abnormal repeater.

There is further provided an associated repeater station, comprising: at least one processor, at least one network interface or communication interface, and a memory configured to store program instructions, the at least one processor being configured to perform the following operations according to the program instructions:

monitoring whether there occurs a communication abnormality on a repeater in local site;

if there is detected a communication abnormality on a repeater (hence an abnormal repeater or malfunctioning repeater), determining whether the abnormal repeater is a free repeater; and if the abnormal repeater is a non-free repeater, updating and broadcasting the state information of the abnormal repeater.

According to the method for abnormality protection on an extended trunked radio system provided by the disclosure, the communication abnormalities such as repeater connection drop or channel interference can be effectively monitored and handled. In particular, if there is detected a communication abnormality on a repeater, the state information of the malfunctioning repeater can be broadcast to other repeaters or terminals, so the terminals can switch to a functioning channel in time for communication. Thus, the anti-interference ability of the system is improved and the system access time for the terminals is reduced, thereby reducing the system's DCR and improving the system access performance. The method provided in the disclosure is applicable to various prior art trunked radio systems.

Furthermore, the system performance is further improved by providing more efficient and flexible interference handling schemes than the prior art. In addition, the service provided by a repeater can be terminated if channel interference is detected thereon, avoiding the transmissions over the interference channel from affecting other systems.

DETAILED DESCRIPTION

Embodiments of the present disclosure can be applied to extended trunked radio systems. An extended trunked radio system may be comprised of a plurality of sites, each site comprising a plurality of primary repeaters and a dynamically updated free repeater.

Talkgroups in the system may be assigned evenly onto different primary repeaters. Typically, terminal users may initiate a call on an assigned primary repeater.

Any vacant repeater might be eligible to be selected as the free repeater. However, within one site there would be only one free repeater at a time. The free repeater can be selected from a list of vacant repeaters in the local site. As such, if the free repeater becomes busy (i.e., idle slots are all occupied), then the system may designate a new free repeater.

Hereinafter, technical solutions embodied by embodiments of the disclosure will be described in definite and comprehensive details with reference to the accompanying drawings. Obviously, the embodiments as described are only some but not all of embodiments of the disclosure. All other embodiments derived by those of ordinary skill in the art based on the disclosure without making inventive efforts shall all fall in the scope of the disclosure.

Embodiments of the disclosure are configured to automatically monitor the communication abnormalities that might occur on an extended trunked radio system and, if a communication abnormality is detected, inform the repeaters or terminals to update the relevant information in time to ensure the normal operation of the system in face of the abnormalities.

Figure 1:
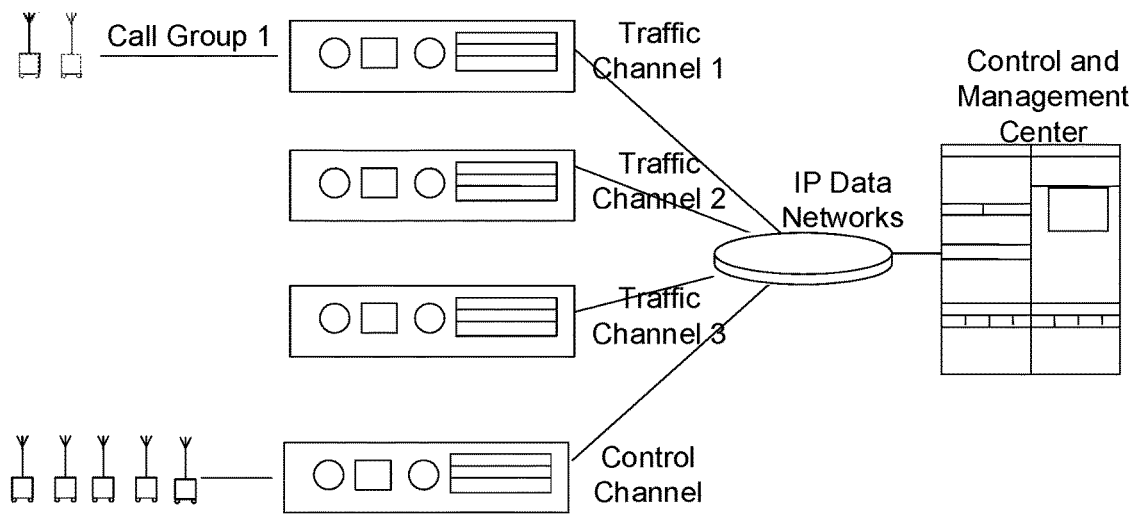
FIG. 1 is a schematic diagram of a prior art centralized trunked radio system.
Figure 2:
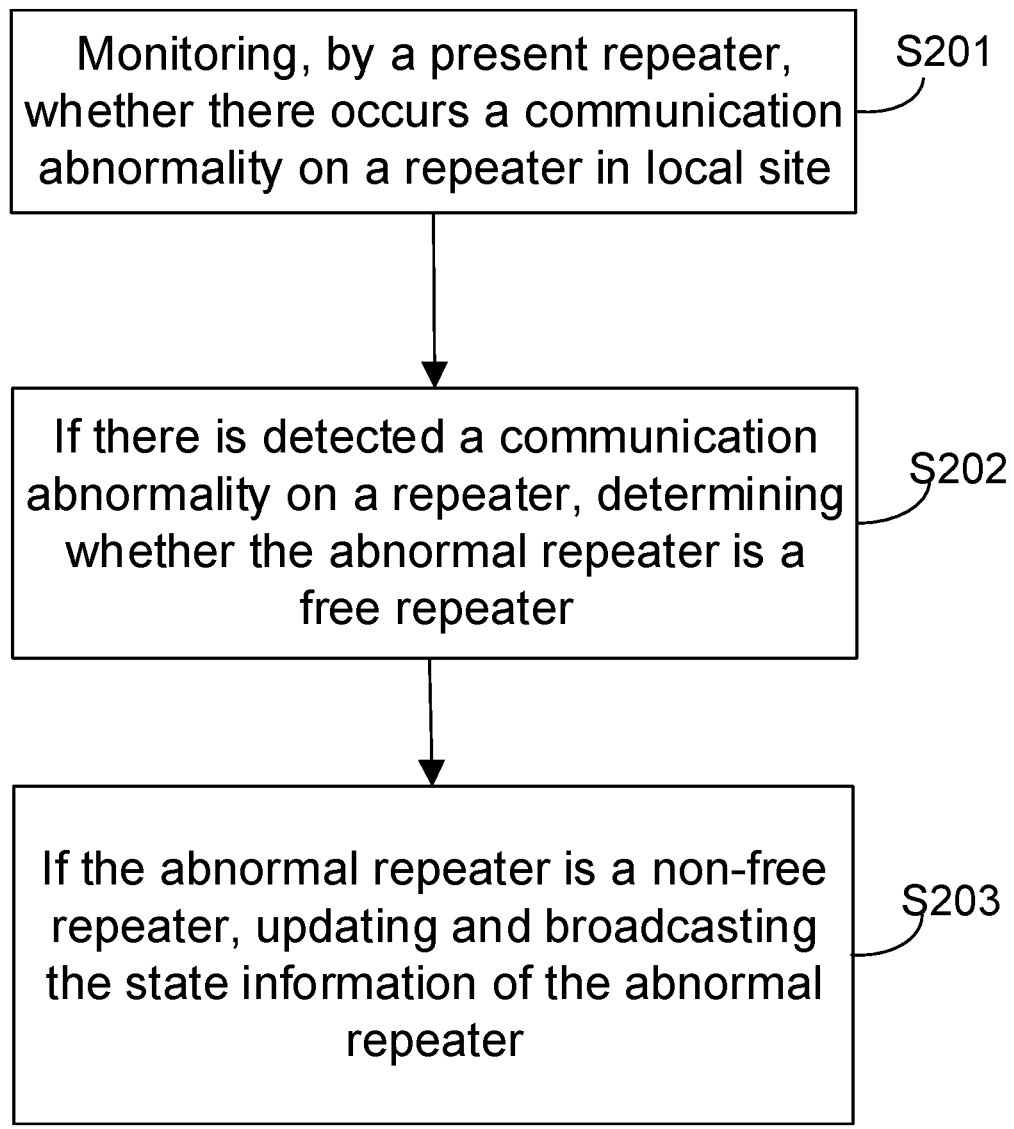
FIG. 2 is a flowchart illustrating a first embodiment of a method for abnormality protection on an extended trunked radio system according to the disclosure.

FIG. 2 depicts a flowchart illustrating a first embodiment of a method for abnormality protection on an extended trunked radio system. The method may comprise the following blocks.

In S201, the method may include monitoring, by a present repeater, whether there occurs a communication abnormality on a repeater in the local site of the extended trunked radio system.

In S202, the method may include: if there is detected a communication abnormality on a repeater—hence an abnormal repeater or malfunctioning repeater, determining, by the present repeater, whether the abnormal repeater is a free repeater.

In S203, the method may include: if the abnormal repeater is a non-free repeater, updating and broadcasting, by the present repeater, the state information of the abnormal repeater.

According to method described above, the communication abnormalities such as repeater connection drop or channel interference can be effectively monitored and handled. In particular, if there is detected communication abnormality on a repeater, the state information of the malfunctioning repeater can be broadcast to other repeaters or terminals, so the terminals can switch to a functioning channel in time for communication. Thus, the anti-interference ability of the system is improved and system access time for the terminals is reduced, thereby reducing the system's DCR and improving the system access performance. The method provided is applicable to various prior art trunked radio systems.

The communication abnormalities mentioned above may typically comprise interference at uplink or downlink frequencies (hereinafter also interchangeably referred to as uplink or downlink interference) of the repeaters, repeater connection drop, etc. Different schemes are provided in the disclosure to handle different types of communication abnormalities.

For example, in the uplink interference scenario, a present repeater may detect in real time whether there is any interference at the uplink frequencies. In particular, if a carrier is detected as valid on the uplink, then a carrier detection timer might be activated. If within the duration of the timer the carrier is continually detected as valid but cannot be normally decoded, or if the carrier can be decoded to obtain a valid signal but the characteristic of such a decoded signal is determined as that of a non-intra-system signal, then it would be determined that there is uplink interference. As such, the present repeater may notify other repeaters in the local site to update the repeater-state information, and if the repeater on which uplink interference occurs, i.e., the malfunctioning repeater, is a free repeater, then a new free repeater may need to be designated. Further, the present repeater may notify through the air interface the terminals within the coverage area of the present repeater to switch to a new available repeater for listening or traffic transmissions, where, in particular, the notification may be issued using a state-broadcast message frame in the air interface protocol. Furthermore, if the repeater on which terminals stays listening broadcasts that a certain repeater is abnormal or malfunctioning, then the terminals will not use the malfunctioning repeater for communication.

In the downlink interference scenario, terminals or other detection equipment can be used to assist the detection of downlink signals from a present repeater. The detection equipment may be configured as a downlink receiving frequency for the present repeater, and be responsible for detecting downlink signals (i.e., carriers). In particular, a carrier detection timer might be activated. If within the duration of the timer the carrier is continually detected as valid on the downlink but cannot be normally decoded, or if the carrier can be decoded to obtain a valid signal but the characteristic of such a decoded signal is determined as that of a non-intra-system signal, then it may be determined that there is downlink interference and the detection equipment may notify the present repeater of the downlink interference. The present repeater then may notify other repeaters in the local site to update the repeater-state information. If the present repeater on which the downlink interference occurs, i.e., the malfunctioning repeater, is a free repeater, then a new free repeater may need to be designated. Thus, if the downlink is malfunctioning such that the terminals cannot normally receive data from the present repeater, the terminals would search for another available repeater by scanning and perform listening or traffic transmissions using the available repeater.

If the detection equipment later detects that the carrier becomes invalid, then it may promptly notify the present repeater that the interference has disappeared, so that the present repeater can recover to its normal working state.

In the repeater connection drop scenario, a present repeater may monitor in real time whether there is a repeater in the local site disconnected from the network, i.e., whether a connection drop happens to a repeater. If a connection drop happens to another repeater, then the present repeater may broadcast the message to other repeaters in the local site to notify them to update the repeater-state information. Further, if the dropped repeater is a free repeater, then a new free repeater may be designated from among the remaining repeaters in the local site, and a state-broadcast message frame may be issued through the air interface to inform the terminals within the coverage area of the present repeater of the dropped repeater so that the terminals currently residing on this malfunctioning repeater can switch to other available repeaters for listening or service. On the other hand, if the present repeater detects a connection drop of itself, then it may notify the connection drop to the terminals within its coverage area via the air interface.

Hereinbelow, a detailed description of the disclosure will be rendered in connection with particular embodiments and with reference made to the accompanying drawings.

To allow the terminals to obtain the index of the free repeater and indications of states of the repeaters in the system described above, a state message frame structure is proposed below. It should however be noted that the state message frame structure as illustrated is only one implementation of the disclosure, and any other frame structures as would be conceivable by those skilled in the art shall also fall in the scope of the disclosure. Configuration of the state message frame is defined in Table 1 below.

TABLE 1

Configuration of the system-broadcast site state message

| SN | Site State Opcode |
|---|---|
| | Hytera MFID |
| Free Repeater Num | R1.StateInfo |
| R2.StateInfo | R3.StateInfo |
| | R1.AddressInfo |
| | R2.AddressInfo |
| | R3.AddressInfo |

Each repeater in the local site may periodically send out the site state information when the channel is idle in order to inform the terminals (interphones) within the coverage area of the repeater of the state information of forwarding frequencies in the local site, the site state information including indications of the state and call type, and call forwarding address information in time slots 1 and 2 (including the call hashed addresses carried in the time slots 1 and 2).

In Table 1, SN is used to indicate the sequence number of the site state message frame, where each site state message frame may comprise the state information of three repeaters and 6 logical channels. SN=0 may indicate the state message frame carries the state information of logical channels of repeaters numbered 1-3; SN=1 may indicate the state message frame carries the state information of logical channels of repeaters numbered 4-6; SN=2 may indicate the state message frame carries the state information of logical channels of repeaters numbered 7-9; and SN=3 is reserved for future use.

TABLE 2

Site state message unit

| Information Element | Length | Value | Remark |
|---|---|---|---|
| SN | 2 | 00 | show information of 6 logic channels CH1-CH6 included in repeaters R1-R3 in site |
| | | 01 | show information of 6 logic channel CH7-CH12 included in repeaters R4-R6 in site |
| | | 10 | show information of 6 logic channel CH13~CH18 included in repeaters R7-R9 in site |
| | | 11 | Reserved for future use |
| Site State Opcode | 6 | 0x0A | Site State Message |
| MFID | 8 | 0x68 | Hytera MFID |
| Free Repeater Num | 4 | 0-15 | This is an available free repeater on local site. 0 indicates all channels are busy. |

TABLE 3

Repeater state information (Rn.StateInfo) unit

| Information element | Length | Value | Remark |
|---|---|---|---|
| TimeSlot1.State | 1 | 0 | Indicate the state of logic channel 1 is idle. |
| | | 1 | Indicate the state of logic channel 1 is busy. |
| TimeSlot1.Activity | 1 | 0 | Individual call activity on time slot 1 |
| | | 1 | Group call activity on time slot 1 |
| TimeSlot2.State | 1 | 0 | Indicate the state of logic channel 2 is idle. |
| | | 1 | Indicate the state of logic channel 2 is busy |
| TimeSlot2.Activity | 1 | 0 | Individual call activity on time slot 2 |
| | | 1 | Group call activity on time slot 2 |

TABLE 4

Repeater address information (Rn.AddressInfo) unit

| Information element | Length | Value | Remark |
|---|---|---|---|
| TimeSlot1.HashedAddress | 8 | 0-255 | Compressed time slot 1 destination address. |
| TimeSlot2.HashedAddress | 8 | 0-255 | Compressed time slot 2 destination address. |

TABLE 5

State-broadcast message when connection drop or uplink interference occurs on a repeater

| Information element | Rn.StateInfo | TimeSlot1. HashedAddress | TimeSlot2. HashedAddress |
|---|---|---|---|
| Repeater abnormality | 1111 | 0 | 0 |

The Rn.StateInfo of a present repeater in the state-broadcast message frame may be set to 111, while the TimeSlot1.HashedAddress and TimeSlot2.HashedAddress may both be set to 0, to indicate the present repeater is malfunctioning, as shown in Table 5. As such, after they obtain the parameters, the terminals may determine that the stated repeater is malfunctioning.

Embodiment 2

Figure 3:
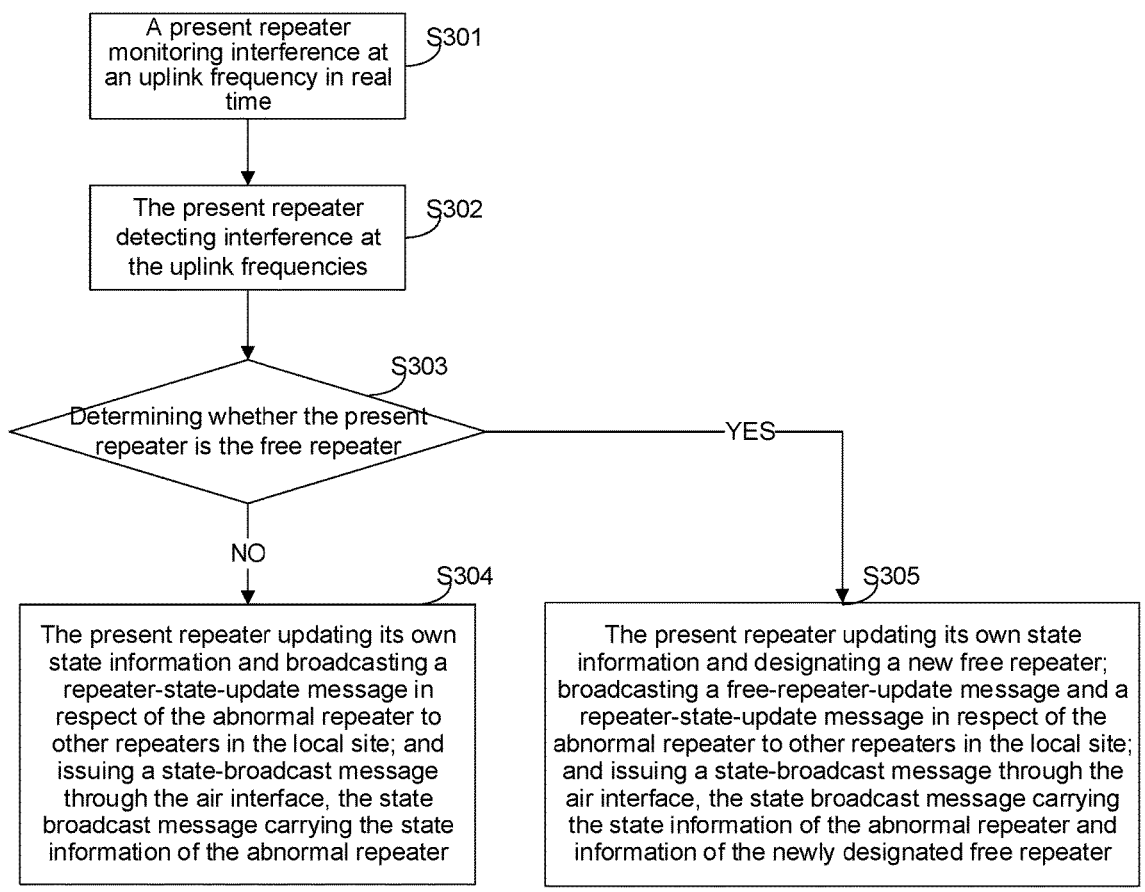
FIG. 3 is a flowchart illustrating a second embodiment of the method for abnormality protection on an extended trunked radio system according to the disclosure.

FIG. 3 depicts a flowchart illustrating a second embodiment of the method for abnormality protection on an extended trunked radio system. The method can be used to handle the interference at the uplink frequencies of a repeater and may comprise the following blocks.

In S301, the method may include monitoring, by a present repeater, in real time whether there occurs interference at the uplink frequencies (i.e., uplink interference) of the present repeater.

To perform the monitoring, the present repeater may first be powered on and initialized, and the system may have a normal network connection and stay in the standby mode. The present repeater may be in the emitting or sleep state, in which if the receiving end of the present repeater detects a valid carrier, the present repeater may start a carrier detection timer and wait for the timer to time out.

If, during the period of waiting for the timer to expire, the present repeater detects that the carrier becomes invalid, then it may stop the timer and determine that there is no uplink interference at the moment, or, if any, the interference has disappeared, so that the present repeater can return to its initial state and continue to detect the carrier.

In S302, the present repeater may detect uplink interference.

Namely, a communication abnormality may occur on the present repeater. In particular, it may be determined that there is interference at the uplink frequencies of the present repeater if, during the period of waiting for the timer to expire, the carrier (i.e., uplink signal) is continually detected as valid but cannot be decoded to obtain a valid signal, and/or if although such a carrier as detected can be decoded to obtain a valid signal, the characteristic of the decoded signal is determined as that of a non-intra-system signal, i.e., the decoded signal is not of the present system.

Further, to eliminate the potential influence of other factors, the present repeater may wait for the carrier detection timer to time out and then determine that there is interference at the uplink frequencies.

In S303, the method may include determining whether the present repeater is the free repeater, and if yes, the method may proceed to S305; otherwise to S304.

In S304, the method may include: updating the state information of the present repeater and broadcasting a repeater-state-update message in respect of the malfunctioning repeater, i.e. the present repeater, the repeater-state-update message carrying abnormality parameters of the present repeater that are configured to notify other repeaters in the local site to update the state information of the malfunctioning repeater; and sending out a state-broadcast message to the terminals within the coverage area of the present repeater, the state-broadcast message containing the state information of the malfunctioning repeater and being used to notify the terminals of the communication abnormality of the malfunctioning repeater so that the terminals can switch to other available repeaters.

In S305, the method may include: updating the state information of the present repeater, and designating a new free repeater; broadcasting a free-repeater-update message as well as a repeater-state-update message in respect of the malfunctioning repeater to other repeaters in the local site; and issuing a state-broadcast message via the air interface to the terminals within the coverage area of the present repeater, the state-broadcast message carrying the state information of the malfunctioning repeater and information of the newly designated free repeater.

In particular, if the present repeater determines itself is the free repeater, a new free repeater would need to be designated and informed to other repeaters and terminals in the local site, so that the other repeaters can update the free repeater and the state information of the malfunctioning repeater according to the received free-repeater-update message and the received state information of the malfunctioning repeater, and the terminals can also obtain the information of the new free repeater and so can switch to and reside on other available repeaters for listening based on the received state-broadcast message.

Typically, the present repeater may broadcast a message to other repeaters in the local site through the network established among the repeaters in the local site.

If there beforehand is interference on the present repeater, i.e., the receiving end of the present repeater detects a valid carrier, but later detects that the carrier becomes invalid during the period of waiting for the carrier detection timer to expire, then the present repeater may determine the interference has disappeared and so may notify the repeaters in the local site by broadcast and, meanwhile, update its own broadcast state and issue a state-broadcast message to the terminals within the coverage area of the present repeater. When a terminal receives the state-broadcast message and so learns that the present repeater recovers to normal, the terminal may further determine whether the present repeater is a primary repeater, and if yes, the terminal may switch to and reside on the repeater for listening.

Embodiment 3

Figure 4:
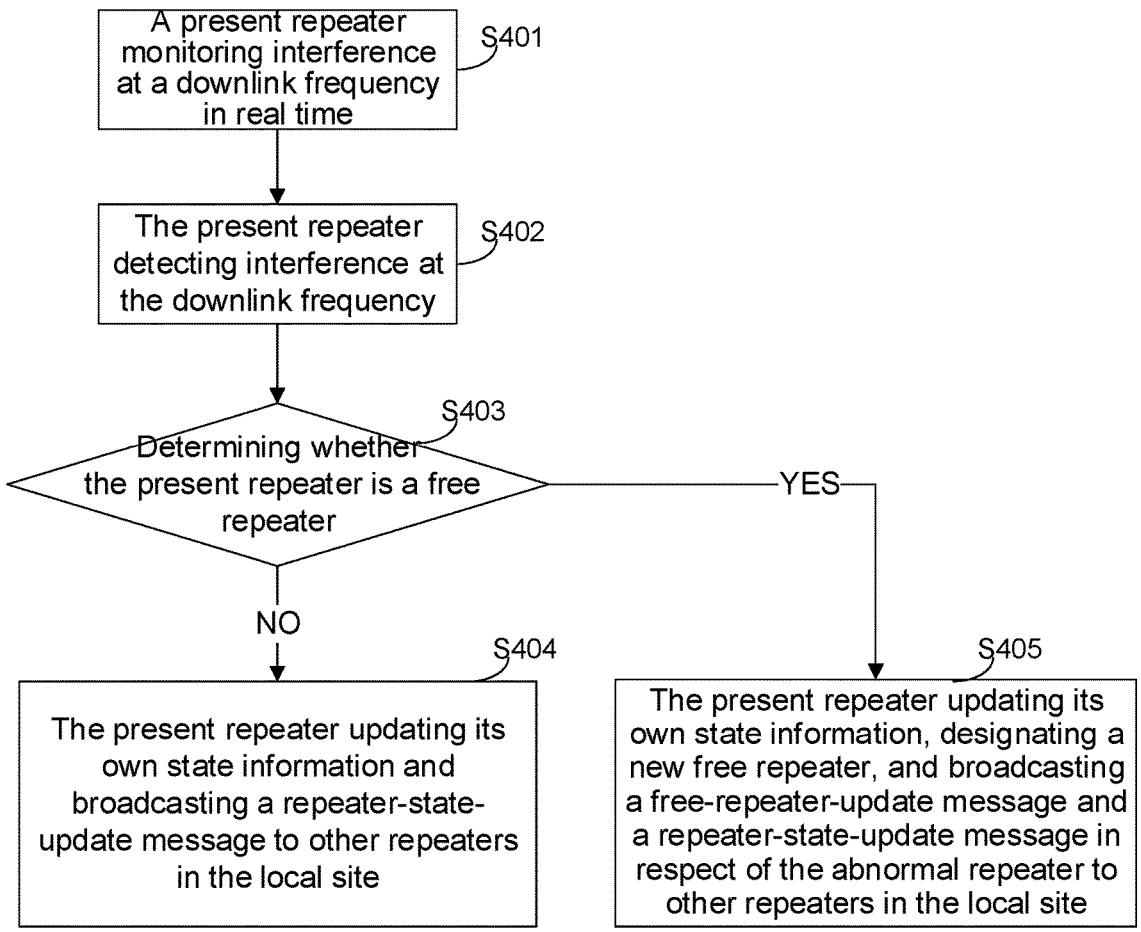
FIG. 4 is a flowchart illustrating a third embodiment of the method for abnormality protection on an extended trunked radio system according to the disclosure.

FIG. 4 depicts a flowchart illustrating a third embodiment of the method for abnormality protection on an extended trunked radio system. The method can be used to handle the interference at the downlink frequencies (i.e., downlink interference) of a repeater and may comprise the following blocks.

In S401, the method may include monitoring, by a present repeater, in real time whether there occurs interference at the downlink frequencies of the present repeater.

In particular, the present repeater may use detection equipment to monitor any interference at the downlink frequencies in real time, and determine there might be downlink interference if a notification is received from the detection equipment that there is downlink interference. The detection equipment may be in a receiving state at a downlink frequency of the present repeater.

If the detection equipment detects a valid carrier but the carrier is unable to be decoded to obtain a valid signal, or although the carrier can be decoded to obtain a valid signal, the characteristic of such a decoded signal is determined as that of a non-intra-system signal, then a carrier detection timer may be started and the detection equipment may wait for the timer to time out.

If, during the period of waiting for the timer to expire, the carrier becomes invalid, then the present repeater may terminate the timer and return to its initial state to continue to detect the carrier.

If the timer times out, it may indicate there is interference at the downlink, so the detection equipment may send a notification to the present repeater that there is interference at the downlink of the present repeater.

In S402, the present repeater may detect downlink interference.

Namely, if the present repeater receives the notification from the detection equipment that there is interference at the downlink frequencies, then it might indicate a communication abnormality occurs on the present repeater.

In S403, the method may include determining whether the present repeater is the free repeater, and if yes, the method may proceed to S405; otherwise to S404.

In S404, the method may include updating the state information of the present repeater and broadcasting a repeater-state-update message to other repeaters in the local site.

If the present repeater is a non-free repeater, the present repeater may broadcast a repeater-state-update message to other repeaters in the local site to inform them to update the state information of the malfunctioning repeater, and may simultaneously update its own state information.

In S405, the method may include updating the state information of the present repeater, and designating a new free repeater; broadcasting a free-repeater-update message as well as a repeater-state-update message in respect of the malfunctioning repeater to other repeaters in the local site, so as to notify the other repeaters to update the free repeater and the state information of the malfunctioning repeater.

If the present repeater is the free repeater, then a new free repeater may need to be designated, and a free-repeater-update message and a repeater-state-update message (carrying the abnormality parameters of the malfunctioning repeater) may be broadcast to notify other repeaters in the local site to update the free repeater and the state information of the malfunctioning repeater, and meanwhile the present repeater may also update its own state information.

Further, having updated its own state information, the present repeater may enter an emission-prohibited state, in which the repeater would not be activated or provide any forwarding services, in order to avoid interfering with the operations of other systems.

If the downlink is malfunctioning so that terminals cannot normally receive data from the malfunctioning repeater, then the terminals can search for other functioning repeaters by scanning and so perform listening or traffic transmissions using the available free repeater found.

After detecting the interference, the detection equipment may continue detecting the downlink signal, and, when the interference disappears, notify the present repeater to recover to its normal working state, so that the present repeater may notify the other repeaters in the local site to accordingly update the repeaters state information and at the same time exit the emission-prohibited state.

Embodiment 4

Figure 5:
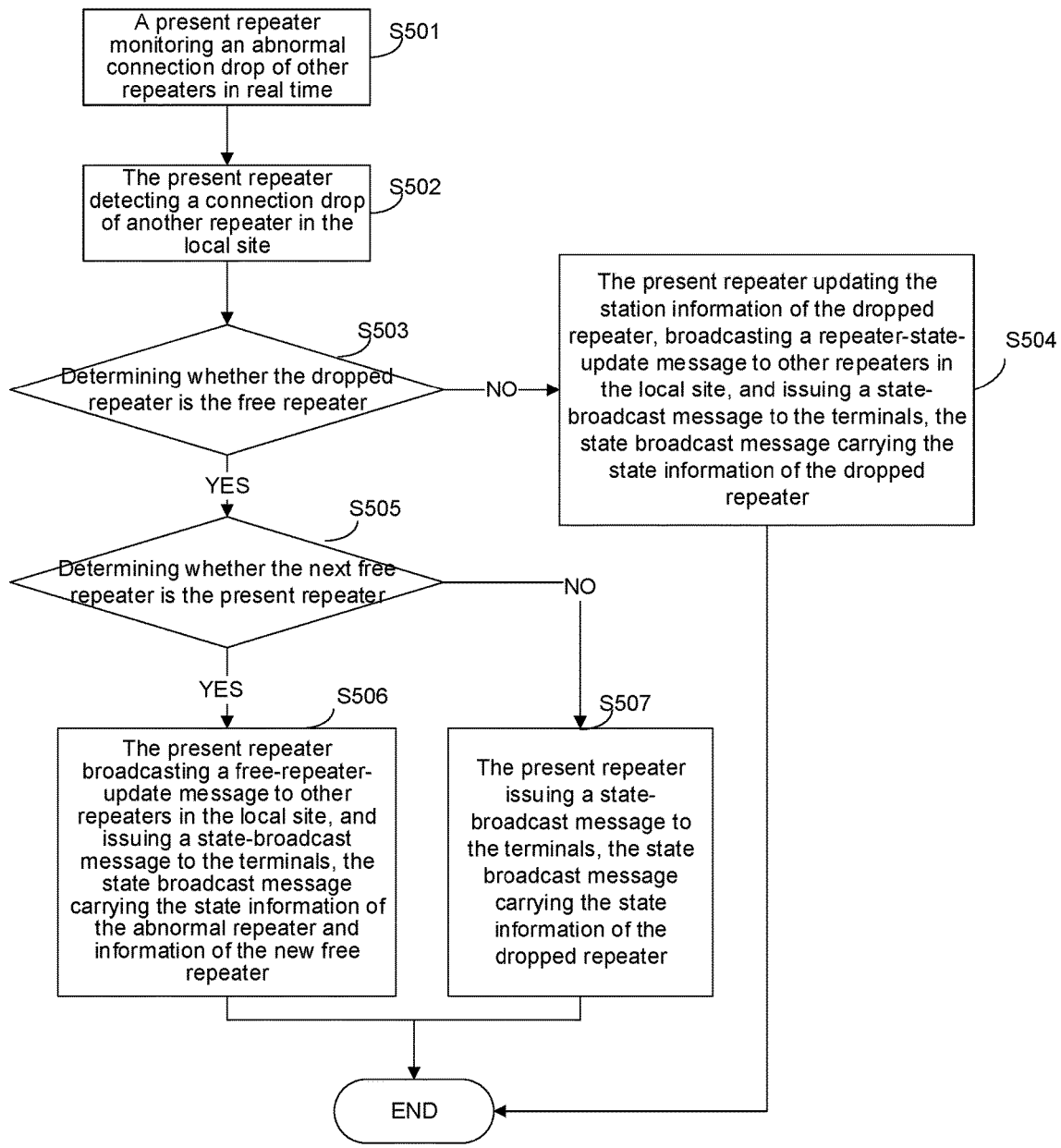
FIG. 5 is a flowchart illustrating a fourth embodiment of the method for abnormality protection on an extended trunked radio system according to the disclosure.

FIG. 5 depicts a flowchart illustrating a fourth embodiment of the method for abnormality protection on an extended trunked radio system. The method can be used to handle the connection drop of a repeater and may comprise the following blocks.

In S501, the method may include monitoring, by a present repeater, in real time whether there happens an abnormal connection drop to another repeater in the local site.

The present repeater may use the network established among the repeaters in the local site to detect whether there is a repeater disconnected from the network, or the present repeater can also learn whether there happens a repeater connection drop in the local site by receiving a repeater-drop notification from another repeater if the another repeater detects a repeater connection drop.

At least one master repeater may be configured in the local site to perform the drop detection, while other repeaters may act as slave repeaters. As such, if the master repeater detects a connection drop of a slave repeater, then the master repeater may issue a repeater-drop notification to inform other slave repeaters of the dropped repeater, thus the slave repeaters would need not to perform active detection, improving the work efficiency.

In S502, if the present repeater detects a connection drop of another repeater in the local site, then the present repeater may determine that a communication abnormality happens to the dropped repeater. In one embodiment, if the present repeater is the master repeater, then it is the master repeater that detects the connection drop of a slave repeater; otherwise if the present repeater is a slave repeater, then it is the slave repeater that receives a repeater-drop notification from the master repeater so that the slave repeater knows which repeater drops its connection according to the repeater-drop notification.

In S503, the method may include determining whether the dropped repeater is the free repeater, and if yes, the method may proceed to S505; otherwise to S504.

In S504, if the dropped repeater is a non-free repeater, the present repeater may update its own repeaters state information according to the state information of malfunctioning repeater, i.e., the dropped repeater, and broadcast a repeater-state-update message to other repeaters in the local site to notify the other repeaters to update the state information of the dropped repeater, and may further issue a state-broadcast message to the terminals within the coverage area of the present repeater, the state-broadcast message carrying the state information of the dropped repeater, so the terminals can learn the state of the dropped repeater in order to carry out suitable treatment.

In S505, the method may include determining whether the next free repeater is the present repeater, and if yes, the method may proceed to S506; otherwise to S507.

In S506, the method may include: if the next free repeater is the present repeater, broadcasting a free-repeater-update message to the other repeaters in the local site, and issuing a state-broadcast message to the terminals within the coverage area of the present repeater, the state-broadcast message carrying the state information of the dropped repeater and information of the new free repeater which is the present repeater.

In S507, the method may include: if the next free repeater is not the present repeater, issuing a state-broadcast message to the terminals within the coverage area of the present repeater, the state-broadcast message carrying the state information of the dropped repeater.

After the dropped repeater gets on line once again, the present repeater may notify other repeaters in the local site by broadcast to update the state information of the dropped repeater, and issue a state-broadcast message to the terminals within the coverage area of the present repeater, the state-broadcast message carrying the information of the dropped repeater recovering to its normal state.

Embodiment 5

Figure 6:
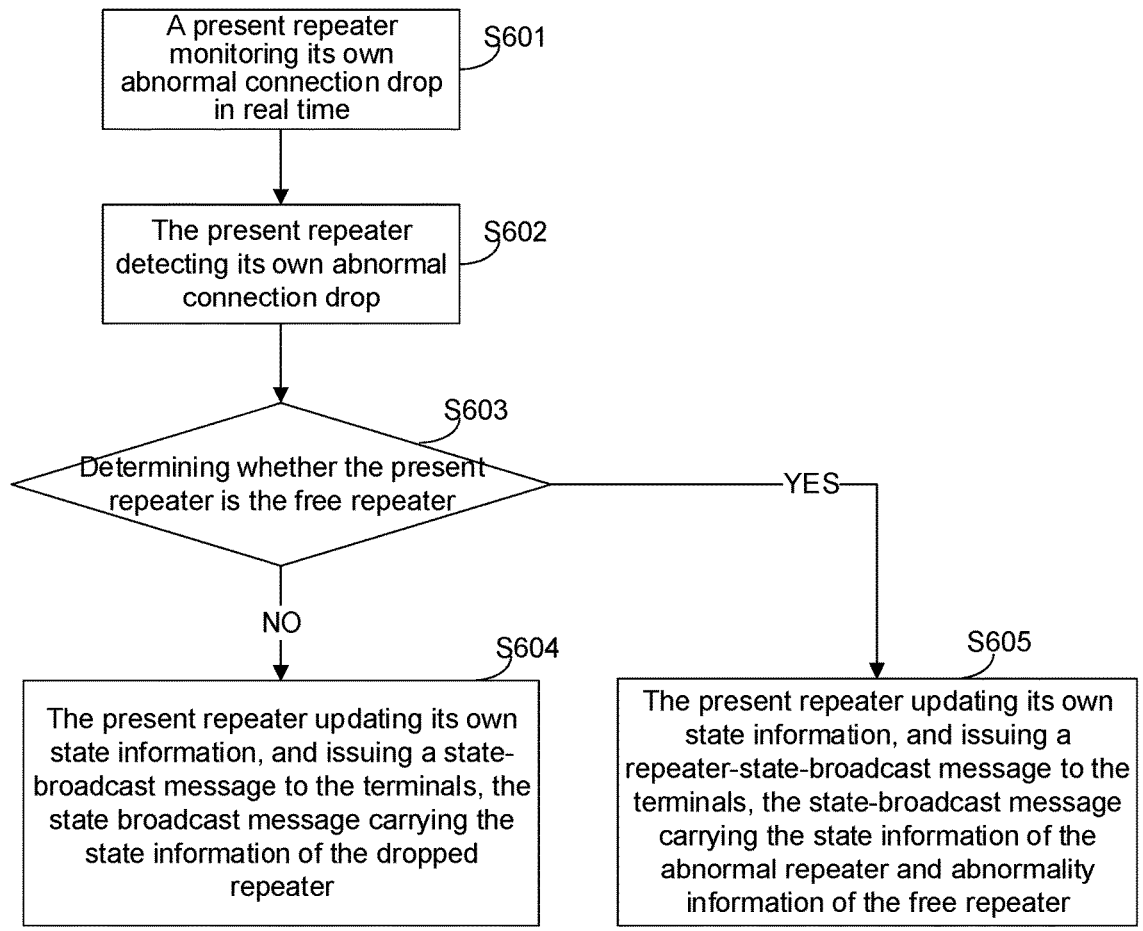
FIG. 6 is a flowchart illustrating a fifth embodiment of the method for abnormality protection on an extended trunked radio system according to the disclosure.

FIG. 6 depicts a flowchart illustrating a fifth embodiment of the method for abnormality protection on an extended trunked radio system. The method can be used to handle the connection drop of a repeater and may comprise the following blocks.

In S601, the method may include monitoring, by a present repeater, in real time whether there happens an abnormal connection drop to itself.

In S602, if the present repeater detects an abnormal connection drop of itself, then the present repeater may determine that a communication abnormality occurs on itself.

In S603, the method may include determining whether the present repeater is a free repeater, and if yes, the method may proceed to S605; otherwise to S604.

In S604, the method may include, if the present repeater is a non-free repeater, updating its own state information and issuing a state-broadcast message to the terminals within the coverage area of the present repeater, the state-broadcast message carrying the state information of the present repeater that has dropped its connection.

In S605, the method may include, if the present repeater is a free repeater, updating its own state information and issuing a state-broadcast message to the terminals within the coverage area of the present repeater, the state-broadcast message carrying the state information of the present repeater that has dropped its connection and the abnormality information of the free repeater.

In particular, the number of free repeater in the corresponding state-broadcast message may be set to 0 to indicate the malfunctioning of the free repeater, and the state of the present repeater in the state-broadcast message may be updated to abnormal, and then a resulting state-broadcast message frame would be issued to the terminals within the coverage area of the present repeater.

After the terminals currently residing on the present free repeater receive the state-broadcast message frame issued via the air interface, they would notice that the number of free repeater is 0, i.e., the present free repeater is malfunctioning, so the terminals may activate the scanning function to obtain a new free repeater and switch to and reside on the new free repeater for listening.

On the other hand, the terminals can also assist to detect whether the connection of the present repeater drops. If the present repeater on which the terminals reside listening broadcasts a message that all other repeaters in the local site are in an abnormal state, then it may indicate that the present repeater on which the terminals reside listening is a dropped repeater. As such, the terminals may activate the scanning function to obtain a new available repeater.

After the dropped repeater, i.e., the present repeater, gets on line once again, the present repeater may notify other repeaters in the local site by broadcast to update the repeaters state information, and issue a state-broadcast message to the terminals, the state-broadcast message carrying the information of the dropped repeater recovering to its normal state.

There are also provided embodiments of associated repeater stations performing these methods for abnormality protection on an extended trunked radio system.

Embodiment 6

Figure 7:
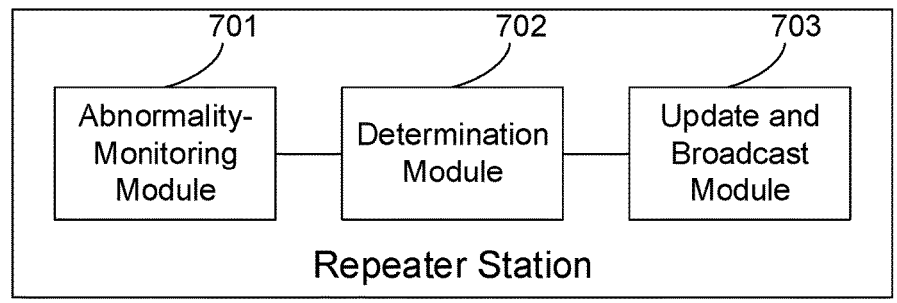
FIG. 7 is a block diagram illustrating a repeater station according to an embodiment of the disclosure.

FIG. 7 depicts a block diagram of a repeater station according an embodiment of the disclosure, the repeater station comprising:

an abnormality-monitoring module 701 configured to monitor in real time whether there occurs a communication abnormality on a repeater in local site;

a determination module 702 configured to, if the abnormality-monitoring unit 701 detects a communication abnormality on a repeater (hence an abnormal repeater or malfunctioning repeater), determine whether the abnormal repeater is a free repeater; and an update and broadcast module 703 configured to, if the determination unit 702 determines the abnormal repeater is a non-free repeater, update and broadcast the state information of the abnormal repeater.

The communication abnormalities mentioned above may comprise interference at the uplink frequencies (i.e., uplink interference) of the repeater. The update and broadcast module 703 may comprise a first update and broadcast unit configured to: if the repeater on which the uplink interference occurs, i.e., the abnormal repeater, is a non-free repeater, update the state information of the abnormal repeater and broadcast a repeater-state-update message in respect of the abnormal repeater; and issue a state-broadcast message to the terminals within the coverage area of the present repeater station, the state-broadcast message carrying the state information of the abnormal repeater.

The update and broadcast module 703 may further comprise a free-repeater update and broadcast unit configured to: if the repeater on which the uplink interference occurs, i.e., the abnormal repeater, is a free repeater, update the state information of the abnormal repeater, and designate a new free repeater; broadcast a free-repeater-update message as well as a repeater-state-update message in respect of the abnormal repeater to other repeaters in the local site; and issue a state-broadcast message to the terminals within the coverage area of the present repeater station, the state-broadcast message carrying the state information of the abnormal repeater as well as information of the newly designated free repeater.

The abnormality-monitoring module 701 may comprise a first abnormality-monitoring unit configured to monitor in real time whether there happens an abnormal connection drop to another repeater in the local site.

The determination module 702 may comprise a first determination unit configured to, if there is detected a connection drop of another repeater or if receiving a repeater-drop notification from another repeater in the local site, determine whether the dropped repeater is a free repeater.

The update and broadcast module 703 may comprise a first update and broadcast unit configured to, if the dropped repeater is a non-free repeater, update the state information of the dropped repeater and broadcast a repeater-state-update message according to the state information of the dropped repeater; and issue a state-broadcast message to the terminals within the coverage area of the present repeater station, the state-broadcast message carrying the state information of the dropped repeater.

The determination module of the present repeater station may further comprise:

a second determination unit configured to, if the abnormal repeater is a free repeater, determine whether the next free repeater is the present repeater station;

a second update and broadcast unit configured to, if the next free repeater is the present repeater station, broadcast a free-repeater-update message to the other repeaters in the local site, and issue a state-broadcast message to the terminals within the coverage area of the present repeater station, the state-broadcast message carrying the state information of the dropped repeater and information of the new free repeater; and a third update and broadcast unit configured to, if the next free repeater is not the present repeater, issue a state-broadcast message to the terminals within the coverage area of the present repeater station, the state-broadcast message carrying the state information of the dropped repeater.

The abnormality-monitoring module may further comprise:

a second abnormality-monitoring unit configured to monitor in real time whether there happens an abnormal connection drop to the present repeater station itself.

The update and broadcast module may comprise a fourth update and broadcast unit configured to, if the dropped repeater, i.e., the present repeater station, is a non-free repeater, update the state information of the present repeater station itself and issue a state-broadcast message to the terminals within the coverage area of the present repeater station, the state-broadcast message carrying the state information of the dropped repeater which is the present repeater station.

The present repeater station may further comprise a fifth update and broadcast unit configured to, if the present repeater station is a non-free repeater, update the state information of the present repeater station itself and issue a state-broadcast message to the terminals within the coverage area of the present repeater station, the state-broadcast message carrying the state information of the dropped repeater which is the present repeater station and the abnormality information of the free repeater.

In addition, the communication abnormalities previously mentioned may comprise interference at the downlink frequencies of the present repeater station.

The determination module may comprise a third determination unit configured to, if receiving a notification from the detection equipment that there is interference at the downlink of the present repeater station, determine whether the repeater on which the downlink interference occurs, i.e., the present repeater station, is a free repeater.

The update and broadcast module may comprise a sixth update and broadcast unit configured to, if the repeater on which the downlink interference occurs, i.e., the present repeater station, is a non-free repeater, update the state information of the present repeater station, and broadcast a repeater-state-update message to other repeaters in the local site.

The present repeater station may further comprise:

a seventh update and broadcast unit configured to, if the repeater on which the downlink interference occurs, i.e., the present repeater station, is a free repeater, designate a new free repeater; and broadcast a free-repeater-update message and a state message in respect of the present repeater station to other repeaters in the local site;

a receiver unit configured to receive a repeater-state-update message in respect of the repeater on which the downlink interference occurs and a free-repeater-update message from another repeater; and an eighth update and broadcast unit configured to update the free repeater and the state information of the malfunctioning repeater, i.e., the present repeater and the broadcast state of the present repeater station itself, according to the state-update message in respect of the repeater on which the downlink interference occurs and the free-repeater-update message.

Embodiment 7

Figure 8:
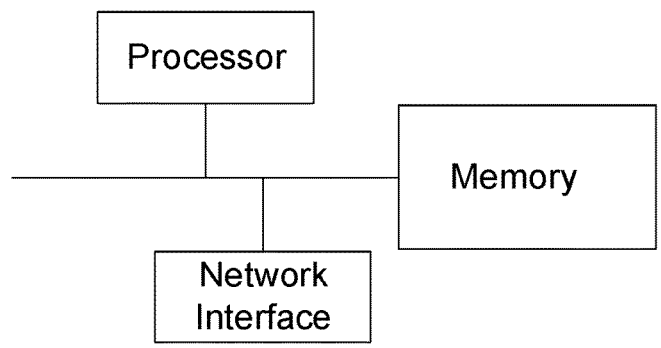
FIG. 8 is a block diagram illustrating the hardware configuration of a repeater station according to an embodiment of the disclosure.

Embodiments of the present disclosure further provide the hardware configuration of a repeater station according to the disclosure. Referring to FIG. 8, the repeater may comprise at least one processor (e.g., CPU), at least one network interface or communication interface, and a memory. The memory may be configured to store program instructions, and the at least one processor may be configured to execute a corresponding executable module, e.g., a computer program, according to the program instructions stored in the memory.

The memory may comprise high-speed Random Access Memory (RAM), or non-volatile memory, e.g., at least one magnetic disk. The repeater station may establish a communications connection with other repeaters in the local site through the at least one network interface.

In some embodiments, the memory may store program instructions, which may be executed by one or more processors, where the program instructions may include the operations illustrated in embodiments 1-5 of the method for abnormality protection on an extended trunked radio system, and thus will not be detailed again.

APPLICATION EXAMPLES

Figure 9:
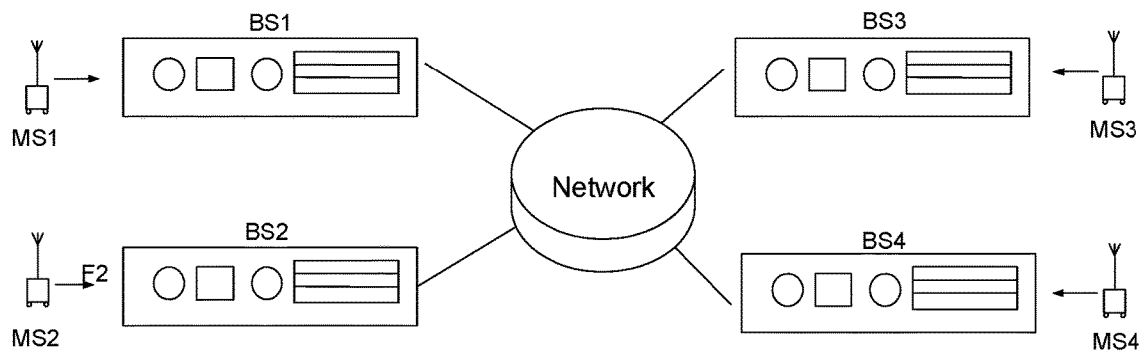
FIG. 9 is a schematic diagram showing a case of distribution of an extended trunked radio system according to an embodiment of the disclosure.

Referring to FIG. 9, a diagram illustrating the distribution of an exemplary extended trunked radio system according to the disclosure is depicted. In the given example, the extended trunked radio system is comprised of 4 primary repeaters and 4 terminals. In the system, terminal MS1 corresponds to primary repeater BS1, terminal MS2 corresponds to primary repeater BS2, terminal MS3 corresponds to primary repeater BS3, and terminal MS4 corresponds to primary repeater BS4. Repeater BS1 is designated as the master repeater, while the remaining three repeaters are slave repeaters, so the present free repeater is BS1. The exemplary extended trunked radio system as illustrated is applicable to the following three example abnormality cases.

Application Example 1

The present example is an application of the disclosure to the case where there is interference at the uplink frequencies of a repeater in the system.

As shown in FIG. 9, if the present free repeater BS1 detects interference at its uplink frequencies, it may designate BS2 as the next free repeater and notify by IP broadcast the other three repeaters of the free repeater update and abnormality of BS1 itself. Simultaneously, BS1 may update its own state information and send its state information to terminal MS1 to notify MS1 that the free repeater has been updated to BS2 and the current primary repeater BS1 of MS1 is malfunctioning. After receiving the state information, MS1 may switch to BS2 and reside on BS2 for listening. Until MS1 detects that the carrier turns invalid, MS1 may return to BS1 for listening.

Application Example 2

The present example is an application of the disclosure to the case where there is interference at the downlink frequencies of a repeater in the system.

As shown in FIG. 9, if a receiving frequency of MS1 is configured as the downlink frequency and serves as the detection equipment, then when MS1 detects interference at the downlink carrier frequency of BS1, MS1 would notify BS1 of the interference and so BS1 may update its own state and, if it is a free repeater, designate a new free repeater and notify BS2, BS3, and BS4 to update the state information of BS1 and information of the newly designated repeater, after which time BS1 may enter an emission-prohibited state. Terminal MS1 may continuously detect the downlink signal, and notify BS1 when the interference disappears, so that BS1 may recover to its normal working state and notify BS2, BS3 and BS4 to update the repeaters state information.

Application Example 3

The present example is an application of the disclosure to the case where a repeater in the system drops its connection.

As shown in FIG. 9, there are shown the master repeater BS1 and other three slave repeaters. Assume the present free repeater is slave repeater BS2, if BS2 drops its connection, the master repeater BS1 may detect the connection drop of BS2 and so broadcast a repeater-drop message in respect of BS2 to repeaters BS3 and BS4. The master repeater BS1 and slave repeaters BS3 and BS4 may jointly determine BS2 as the current free repeater, and may each further determine whether it is the next new free repeater. Assume BS3 is the next free repeater, then the free repeater of the system would be updated to BS3. Meanwhile, BS2 may also detect its current network connection is abnormal and so may set its stored number of free repeater to 0 and update its broadcast state to abnormal, and thus issue a resulting state-broadcast message frame through the air interface. After receiving the state-broadcast message frame from BS2, terminal MS2 may activate its scanning function to obtain a new free repeater and switch to the new free repeater for listening or traffic transmissions.

It will be understood by those skilled in the art that, all or part of technical solutions embodied by the embodiments of the disclosure are stored in the memory of a repeater or terminal in the form of computer programs, which can be executed to perform corresponding functions. Accordingly, all or parts of the embodiments of the disclosure may be present in the form of computer programs in a computer-readable electronic data carrier including, but not limited to, an optical disk, flash disk, hard drive, network disk, and the like.

It should be noted that throughout the document relational terms such as "first" and "second" are used merely to distinguish one entity or operation from another entity or operation without necessarily requiring or implying the existence of such actual relationships or orders between such entities or operations. Further, terms such as "including" "comprising", or any other variations intended for encompassing a non-exclusive inclusion may enable processes, methods, articles, or devices that include a set of elements to not just include those stated elements, but also other elements not explicitly listed or elements inherent to such processes, methods, articles, or devices. In absence of additional limiting, the element modified by the phrase "comprising one . . . " does not preclude the existence of other same elements in such processes, methods, articles, or devices that comprise the stated element.

Furthermore, it is apparent to those skilled in the art that the present disclosure also provides a repeater station that comprises a non-transitory program storage medium and one or more processors. The non-transitory program storage medium stores one or more programs executable by the processor(s) to perform the methods as described above. Furthermore, it is apparent to those skilled in the art that various units or modules 701, 702, and 703 as shown in FIG. 7, can be software modules or software units. In another aspect, it is well-known that various software modules or software units can be inherently stored in the non-transitory program storage medium and executed by the processor(s).

The above description is rendered in detail in connection with exemplary embodiments of the disclosure, which, however, are not intended to limit the disclosure to these specific embodiments. It will be apparent to those skilled in the art to which the disclosure pertains that various deductions or substitutions can be made without departing from the spirit of the disclosure, and these deductions or substitutions shall all fall in the scope of the present disclosure.

What is claimed is:

1. A method for abnormality protection on an extended trunked radio system, the system being comprised of a plurality of sites each comprising a plurality of repeaters, the plurality of repeaters comprising a plurality of primary repeaters and a free repeater, the method comprising:

monitoring, by a present repeater, in real time whether there occurs a communication abnormality on a repeater in a local site;

when there is detected a communication abnormality on the repeater in the local site, determining, by the present repeater, whether the abnormal repeater is the free repeater, wherein there only exists the free repeater in the local site at a time; and when the abnormal repeater is a non-free repeater, updating and broadcasting, by the present repeater, state information of the abnormal repeater to other repeaters in the local site, and issuing the state information of the abnormal repeater to terminals within a coverage area of the abnormal repeater;

when the abnormal repeater is the free repeater, designating another repeater in the local site as the free repeater;

wherein state information of the repeater is included in a broadcasting state information frame, and wherein the broadcasting state information frame comprises a sequence number having a length of 2 bits, a free repeater number having a length of 4 bits, a plurality of state information units, and an address information unit, and wherein each of the plurality of the state information units comprises an information element TimeSlot1.State having a length of 1 bit, an information element TimeSlot1.Activity having a length of 1 bit, an information element TimeSlot2.State having a length of 1 bit, and an information element TimeSlot2.Activity having a length of 1 bit, and the address information unit comprises an information element TimeSlot1.HashedAddress having a length of 8 bits and an information element TimeSlot2.HashedAddress having a length of 8 bits.

2. The method according to claim 1, wherein the communication abnormality comprises interference at an uplink frequency of the abnormal repeater which is the present repeater, and the updating and broadcasting the state information of the abnormal repeater to other repeaters in the local site, and issuing the state information of the abnormal repeater to the terminals within the coverage area of the abnormal repeater comprises:

updating, by the present repeater, the state information of the abnormal repeater and broadcasting a repeater-state-update message with respect to the abnormal repeater to other repeaters in the local site, and issuing a state-broadcast message to the terminals within the coverage area of the present repeater through an air interface, the state-broadcast message carrying the state information of the abnormal repeater.

3. The method according to claim 2, further comprising:
when the abnormal repeater is the free repeater, updating, by the present repeater, the state information of the abnormal repeater, and designating a new free repeater; broadcasting a free-repeater-update message and a repeater-state-update message with respect to the abnormal repeater to the other repeaters in the local site; and issuing a state-broadcast message to the terminals within the coverage area of the present repeater through the air interface, the state-broadcast message carrying the state information of the abnormal repeater and information of the newly designated free repeater.

4. The method according to claim 3, further comprising:
receiving, by a repeater, from the present repeater the repeater-state-update message with respect to the abnormal repeater and the free-repeater-update message; and
updating, by the repeater, the free repeater and the state information of the abnormal repeater and updating its own broadcast state according to the received repeater-state-update message and the free-repeater-update message.

5. The method according to claim 2, wherein when an uplink signal is detected but is unable to be normally decoded, interference at the uplink frequency of the repeater is detected; or
when an uplink signal is detected but a decoded signal is not a signal of the present system, interference at the uplink frequency of the repeater is detected.

6. The method according to claim 5, wherein the interference at the uplink frequency of the present repeater is detected after a timer for detecting a carrier expires.

7. The method according to claim 2, further comprising:
after detecting that the interference at the uplink frequency of the present repeater disappears, broadcasting, by the present repeater, a state-recovery message to the other repeaters in the local site, and, if the state information of the abnormal repeater has been sent to the terminals within the coverage area of the present repeater when the interference at the uplink frequency occurs, issuing a state-broadcast message to the terminals, the state-broadcast message carrying information that the abnormal repeater has recovered to its normal state.

8. The method according to claim 1, wherein the communication abnormality comprises a connection drop of another repeater in the local site, when the communication abnormality comprises the connection drop of the another repeater in the local site, the abnormal repeater is the another repeater;
the detecting the communication abnormality on the repeater comprises: detecting, by the present repeater, a connection drop of another repeater in the local site, or receiving, by the present repeater, a repeater-drop notification from another repeater in the local site; and
the updating and broadcasting the state information of the abnormal repeater to the other repeaters in the local site, and issuing the state information of the abnormal repeater to the terminals within the coverage area of the abnormal repeater comprises:
updating, by the present repeater, state information of the another repeater and broadcasting a repeater-state-update message with respect to the another repeater to other repeaters in the local site; and issuing a state-broadcast message to the terminals within the coverage area of the present repeater through an air interface, the state-broadcast message carrying the state information of the abnormal repeater.

9. The method according to claim 8, further comprising:
when the abnormal repeater is the free repeater, determining whether a next free repeater is the present repeater;
when the next free repeater is the present repeater, broadcasting a free-repeater-update message to the other repeaters in the local site, and issuing a state-broadcast message to the terminals within the coverage area of the present repeater through the air interface, the state-broadcast message carrying the state information of the abnormal repeater and information of the new free repeater; and
when the next free repeater is not the present repeater, issuing a state-broadcast message to the terminals within the coverage area of the present repeater through the air interface, the state-broadcast message carrying the state information of the abnormal repeater.

10. The method according to claim 1, wherein the communication abnormality comprises a connection drop of the present repeater in the local site, when the communication abnormality comprises the connection drop of the present repeater in the local site, the abnormal repeater is the present repeater;
the detecting the communication abnormality on the repeater comprises: detecting, by the present repeater, an abnormal connection drop of itself; and
the updating and broadcasting the state information of the abnormal repeater to other repeaters in the local site, and issuing the state information of the abnormal repeater to the terminals within the coverage area of the abnormal repeater comprises:
updating, by the present repeater, its own state information and issuing a state-broadcast message to the terminals within the coverage area of the present repeater, the state-broadcast message carrying the state information of the present repeater.

11. The method according to claim 10, further comprising:
when the present repeater is the free repeater, updating, by the present repeater, its own state information and issuing a state-broadcast message to the terminals within the coverage area of the present repeater through an air interface, the state-broadcast message carrying the state information of the abnormal repeater and abnormality information of the free repeater.

12. The method according to claim 1, wherein the communication abnormality comprises interference at a downlink frequency of the abnormal repeater which is the present repeater, and
the detecting the communication abnormality on the repeater comprises: receiving, by the present repeater, a notification from a detection equipment that there is interference at the downlink frequency of the present repeater; and
the updating and broadcasting the state information of the abnormal repeater comprises: updating, by the present repeater, the state information of the abnormal repeater and broadcasting a repeater-state-update message with respect to the abnormal repeater to other repeaters in the local site.

13. The method according to claim 12, further comprising:

when the abnormal repeater is the free repeater, designating, by the present repeater, a new free repeater; and broadcasting a free-repeater-update message and a repeater-state-update message with respect to the abnormal repeater to the other repeaters in the local site.

14. The method according to claim 12, further comprising: entering, by the present repeater, an emission-prohibited state.

15. The method according to claim 1, wherein the one of the plurality of state information units with a value 1111, and the information element TimeSlot1.HashedAddress with a value 0 and the information element TimeSlot2.HashedAddress with a value 0 indicate that a repeater corresponding to the one of the plurality of state information units is the abnormal repeater.

16. A repeater station, comprising: at least one processor, at least one network interface or communication interface, and a memory configured to store program instructions, the at least one processor being configured to perform the following operations according to the program instructions, wherein the following operations comprises:
monitoring whether there occurs a communication abnormality on a repeater in a local site;
when there is detected a communication abnormality on the repeater, determining whether the abnormal repeater is a free repeater; and
when the abnormal repeater is a non-free repeater, updating and broadcasting state information of the abnormal repeater to other repeaters in the local site, and issuing the state information of the abnormal repeater to terminals within a coverage area of the present repeater through an air interface;
when the abnormal repeater is the free repeater, designating another repeater in the local site as the free repeater;
state information of the repeater is included in a broadcasting state information frame, and wherein the broadcasting state information frame comprises a sequence number having a length of 2 bits, a free repeater number having a length of 4 bits, a plurality of state information units, and an address information unit, and wherein each of the plurality of the state information units comprises an information element TimeSlot1.State having a length of 1 bit, an information element TimeSlot1.Activity having a length of 1 bit, an information element TimeSlot2.State having a length of 1 bit, and an information element TimeSlot2.Activity having a length of 1 bit, and the address information unit comprises an information element TimeSlot1.HashedAddress having a length of 8 bits and an information element TimeSlot2.HashedAddress having a length of 8 bits.

* * * * *